(12) United States Patent
Ovadia

(10) Patent No.: US 7,181,140 B2
(45) Date of Patent: Feb. 20, 2007

(54) METHOD AND APPARATUS FOR IMPLEMENTING AND NETWORKING A SEMICONDUCTOR-BASED OPTICAL BURST SWITCHING MODULE WITHIN OPTICAL NETWORKS

(75) Inventor: Shlomo Ovadia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 674 days.

(21) Appl. No.: 10/126,091

(22) Filed: Apr. 17, 2002

(65) Prior Publication Data

US 2003/0198471 A1    Oct. 23, 2003

(51) Int. Cl.
*H04J 14/00* (2006.01)

(52) U.S. Cl. ............ 398/51; 398/45; 398/47; 398/48; 398/49; 398/54; 398/56; 398/58; 398/79; 370/389; 370/360; 370/396; 370/468

(58) Field of Classification Search ......... 398/51, 398/54, 79, 47, 45, 49, 58, 48, 56; 370/389, 370/360, 396, 468; 359/128, 124
See application file for complete search history.

(56) References Cited

U.S. PATENT DOCUMENTS

| | | | |
|---|---|---|---|
| 6,111,673 A | 8/2000 | Chang et al. | |
| 6,519,062 B1 * | 2/2003 | Yoo | 398/49 |
| 6,873,797 B2 * | 3/2005 | Chang et al. | 398/51 |
| 6,956,868 B2 * | 10/2005 | Qiao | 370/466 |
| 2002/0027686 A1 * | 3/2002 | Wada et al. | 359/128 |
| 2002/0154360 A1 * | 10/2002 | Liu | 359/135 |
| 2002/0196808 A1 * | 12/2002 | Karri et al. | 370/468 |

OTHER PUBLICATIONS

O'Mahony, Mike J., et al., "The Application of Optical Packet Switching in Future Communication Networks", IEEE Communications Magazine, Mar. 2001, pp. 128-135.
Yao, Shun, et al., "All-Optical Packet Switching for Metropolitan Area Networks: Opportunities and Challenges", IEEE Communications Magazine, Mar. 2001, pp. 142-148.

(Continued)

*Primary Examiner*—Hanh Phan
(74) *Attorney, Agent, or Firm*—Blakely, Sokoloff, Taylor & Zafman LLP

(57) ABSTRACT

An intelligent optical burst switching module for use in an optical switching network includes an optical receiver array, optical transmitter array, a core switch unit and a control unit. The core switch unit routes optical control and data signals received via a plurality of optical input lines to the optical receiver array and a plurality of output lines, respectively. The optical output lines provide propagation paths for a plurality of TDM channels. The optical receiver array converts the optical control signal to an electrical signal. The control unit processes the converted control signal and, responsive thereto, causes the core switch unit to route at least a portion of the data signal to one of the TDM channels. The control unit also causes the optical transmitter to generate a new optical control signal and cause the switch unit to route the new control signal to another of the TDM channels.

87 Claims, 9 Drawing Sheets

OTHER PUBLICATIONS

Quiao, Dr. Chunming, et al., "Optical Burst Switching", Business Briefing: Global Photonics Applications & Technology, Nov. 2001, pp. 108-113.

Quaio, Chunming, "Labeled Optical Burst Switching for IP-over-WDM Integration", Optical Networking Solutions for Next-Generation Internet Networks, IEEE Communications Magazine, Sep. 2000, pp. 104-114.

Carena, A., et al., "OPERA: An Optical Packet Experimental Routing Architecture with Label Swapping Capability", Journal of Lightwave Technology, vol. 16, No. 12, Dec. 1998, IEEE, pp. 2135-2145.

Zhong, Wen De, et al., "A New Wavelength-Routed Photonic Packet Buffer Combining Traveling Delay-Line Loops", Journal of Lightwave Technology, vol. 19, No. 8, Aug. 2001, IEEE, pp. 1085-1092.

* cited by examiner

OPTICAL PAYLOAD FORMAT

OPTICAL LABEL FORMAT ns. The modules or units in the ingress, egress and core switching nodes are interchangeable and are also referred to herein as optical burst switching modules (OBS modules).

METHOD AND APPARATUS FOR IMPLEMENTING AND NETWORKING A SEMICONDUCTOR-BASED OPTICAL BURST SWITCHING MODULE WITHIN OPTICAL NETWORKS

FIELD OF THE INVENTION

The field of invention relates to optical networks in general; and, more specifically, to optical burst switching. Still more particularly, the present invention relates to optical burst and packet switching modules and their networking protocols within optical switched networks.

BACKGROUND

Transmission bandwidth demands in telecommunication networks (e.g., the Internet) appear to be ever increasing and solutions are being sought to support this bandwidth demand. One solution to problem is to use fiber-optic networks, where wavelength-division-multiplexing (WDM) technology is used to support the ever growing demand in optical networks for higher data rates.

Conventional optical switched networks typically use wavelength routing techniques that require optical-electrical-optical (OEO) conversion of optical signals. OEO conversion can typically require about ten milliseconds at each switching node in the optical network, which is very costly, and potentially creates a traffic bottleneck for the optical switched network. In addition, current optical switch technologies cannot efficiently support "bursty" nature of the traffic that is often experienced in packet communication applications (e.g., the Internet).

A large network can be implemented using several sub-networks. For example, a large network to support Internet traffic can be divided into a large number of relatively small access networks operated by Internet service providers (ISPs), which are coupled to a number of metropolitan area networks (Optical MANs), which are in turn coupled to a large "backbone" wide area network (WAN). While the local-area networks (LANs) can be relatively low bandwidth, the optical MANs and WANs typically require high bandwidth in order to provide a level of service demanded by their high-end users.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
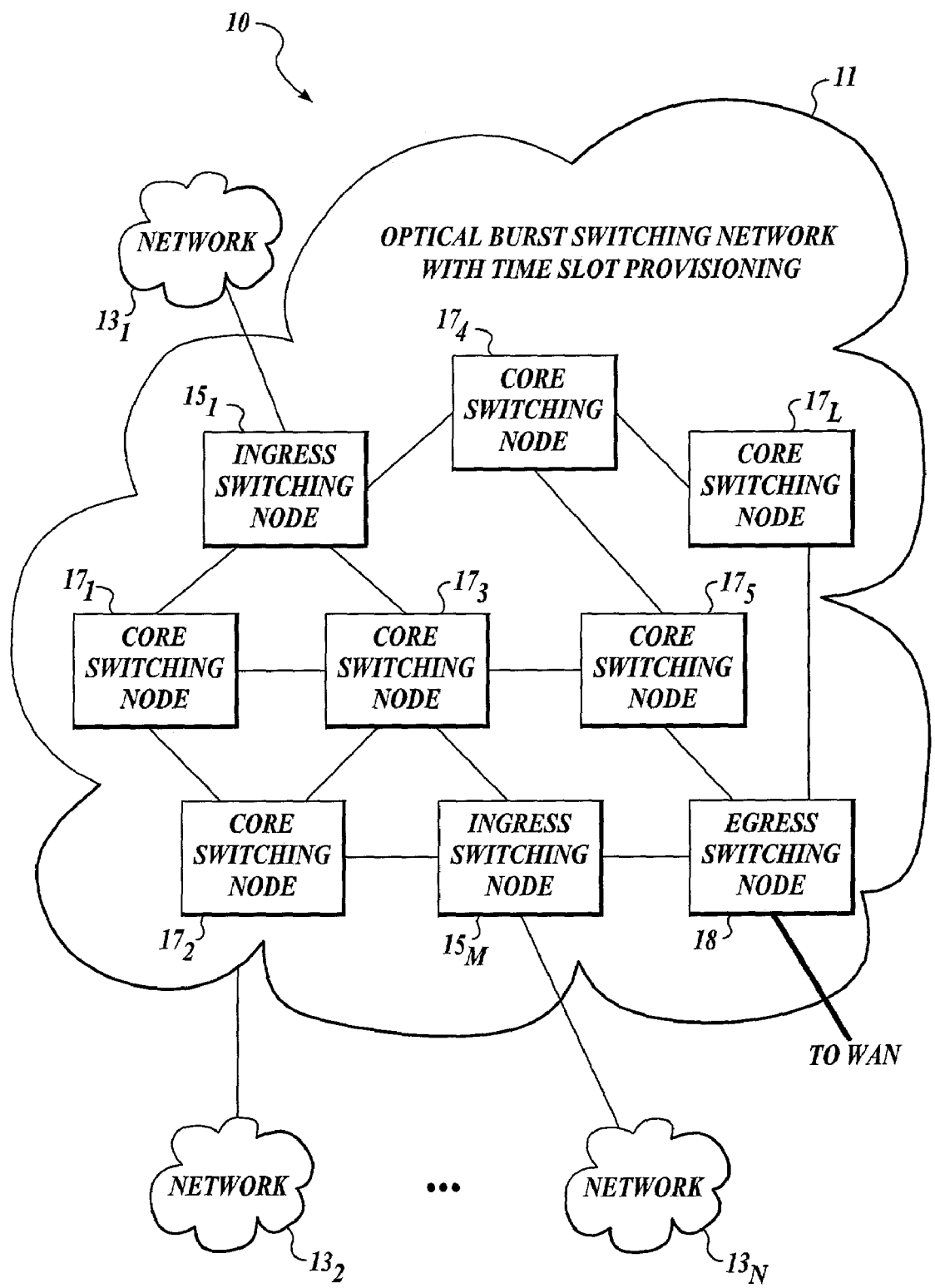
FIGS. 1 and 1A are simplified block diagrams illustrating optical burst switching networks, according to one embodiment of the present invention.

FIG. 1 illustrates an optical burst switching network 10, according to one embodiment of the present invention. The term optical burst is used herein to refer to statistically-multiplexed packets (e.g., internet protocol (IP) packets) having similar routing requirements. An optical burst typically includes an optical label containing the header information of the packets and a payload containing the data segments of the packets.

This embodiment of optical burst switching network 10 includes a optical MAN 11, local area networks (LANs) $13_1$–$13_N$ and a backbone WAN (not shown). In addition, this embodiment of optical MAN 11 includes ingress switching nodes $15_1$–$15_M$, core switching nodes $17_1$–$17_L$, and egress switching node 18. Optical MAN 11 can include other ingress and core switching nodes (not shown) that are interconnected with the switching nodes shown in FIG. 1.

In this embodiment, ingress switching nodes $15_1$–$15_M$ are implemented with optical switching units or modules that are each configured to receive optical signals from a LAN (via a label switch router (LSR) in some embodiments), and appropriately route the received optical signals to other switching nodes of optical MAN 11. In addition, ingress switching nodes $15_1$–$15_M$ are configured to receive optical signals from other switching nodes of optical MAN 11 and send them to other LANs. In one embodiment, the ingress switching nodes perform optical-electrical-optical (OEO) conversion of received optical signals, and include electronic memory to buffer the received signals until they are sent to the appropriate LAN or switching node of optical MAN 11. Embodiments of the ingress switching nodes are described further below.

Egress switching node 18 is implemented with optical switching units or modules that are configured to receive optical signals from other nodes of optical MAN 11 and route them to the WAN. Egress switching node 18 can also receive optical signals from the WAN and send them to the appropriate node of optical MAN 11. In one embodiment, egress switching node 18 performs OEO conversion of received optical signals, and includes electronic memory to buffer received signals until they are sent to the appropriate node of optical MAN 11 (or to the WAN). Embodiments of egress switching node 18 are described further below.

Core switching nodes $17_1$–$17_L$ are implemented with optical switching units or modules that are each configured to receive optical signals from other switching nodes and appropriately route the received optical signals to other switching nodes of optical MAN 11. As is described below, the core switching nodes perform OEO conversion of "control" optical signals. In some embodiments, the control optical signals are propagated only on preselected wavelengths. The preselected wavelengths do not propagate optical "data" (as opposed to control) signals in such embodiments, even though the control signals may be include control information for a particular group of optical data signals. In another embodiment, optical control and data signals may be propagated on the same wavelength(s) using different encoding schemes such as different modulation formats, etc. In either approach, the optical control signals are sent asynchronously relative to its corresponding optical data signals. In still another embodiment, the optical control signals are propagated at different transmission rates as the optical data signals.

Although core switching nodes $17_1$–$17_L$ may perform OEO conversion of the optical control signals, in this embodiment, the core switching nodes do not perform OEO conversion of the optical data signals. Rather, core switching nodes $17_1$–$17_L$ perform purely optical switching of the optical data signals. Thus, the core switching nodes can include electronic circuitry to store and process the incoming optical control signals that were converted to electronic form and use the control information to configure the optical switch settings, and to properly route the optical data signals corresponding to the optical control signals. The new control information, which replaces the previous control information based on the new routing information, is converted to an optical control signal, and it transmitted to the next core or egress switching nodes. Embodiments of the core switching nodes are described further below.

Figure 1A:
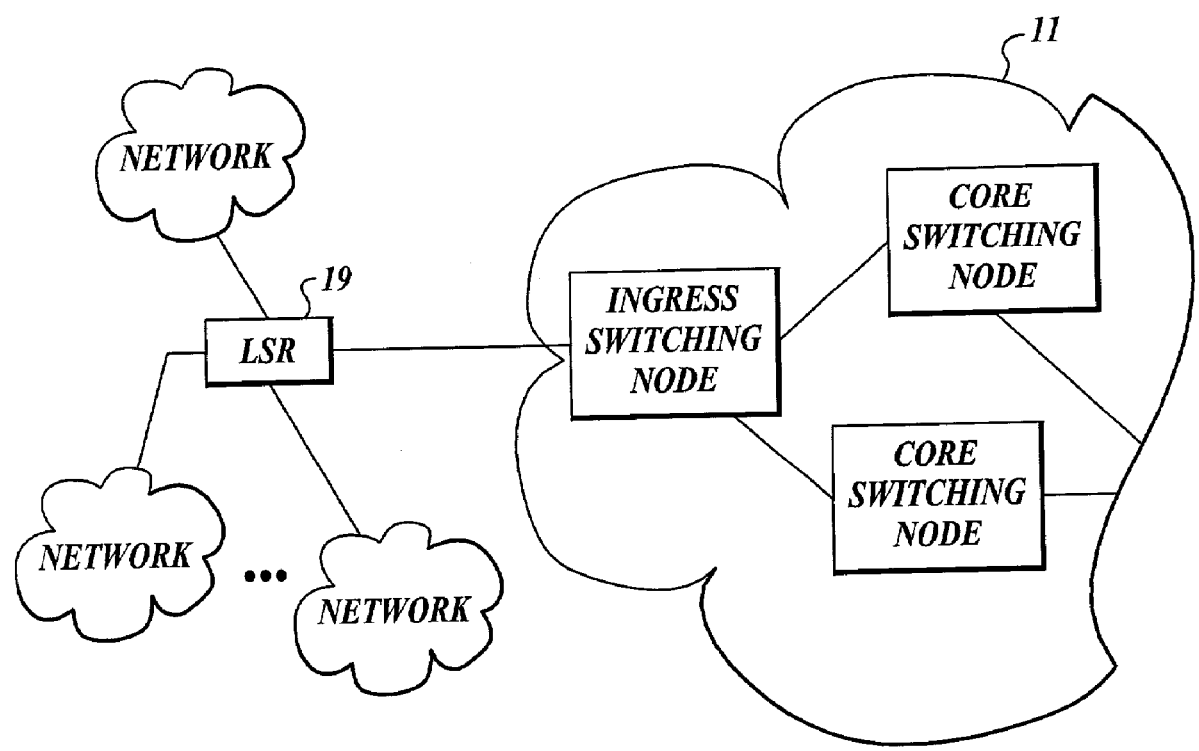

The elements of exemplary optical burst switching network 10 are interconnected as follows. LANs $13_1$–$13_N$ are connected to corresponding ones of ingress switching nodes $15_1$–$15_M$ of optical MAN 11. As shown in FIG. 1A, in some embodiments, a label switching router (LSR) 19 may be interposed between one or more LANs and an ingress switching node.

Within optical MAN 11, ingress switching nodes $15_1$–$15_M$ and egress switching node 18 are connected to some of core switching nodes $17_1$–$17_L$ via optical fibers. Core switching nodes $17_1$–$17_L$ are also interconnected to each other via optical fibers in mesh architecture to form a relatively large number of optical paths or links between the ingress switching nodes, and between ingress switching nodes $15_1$–$15_L$ and egress switching node 18. Ideally, core switching nodes $17_1$–$17_L$ provide more than one optical path between each end point of optical MAN 11 (i.e., the ingress switching nodes and egress switching node 18 are endpoints within optical MAN 11).

As described below in conjunction with FIG. 2, the ingress, egress and core switching nodes of optical MAN 11 are configured to send and/or receive optical burst signals that are wavelength multiplexed so as to propagate the optical labels on preselected wavelength(s) and optical data or payloads on different preselected wavelength(s). In addition, labels (and payloads) can be time division multiplexed (TDM) on a given wavelength. Still further, the endpoints of optical MAN 11 can send optical label signals when sending data out of optical MAN 11.

Figure 2:
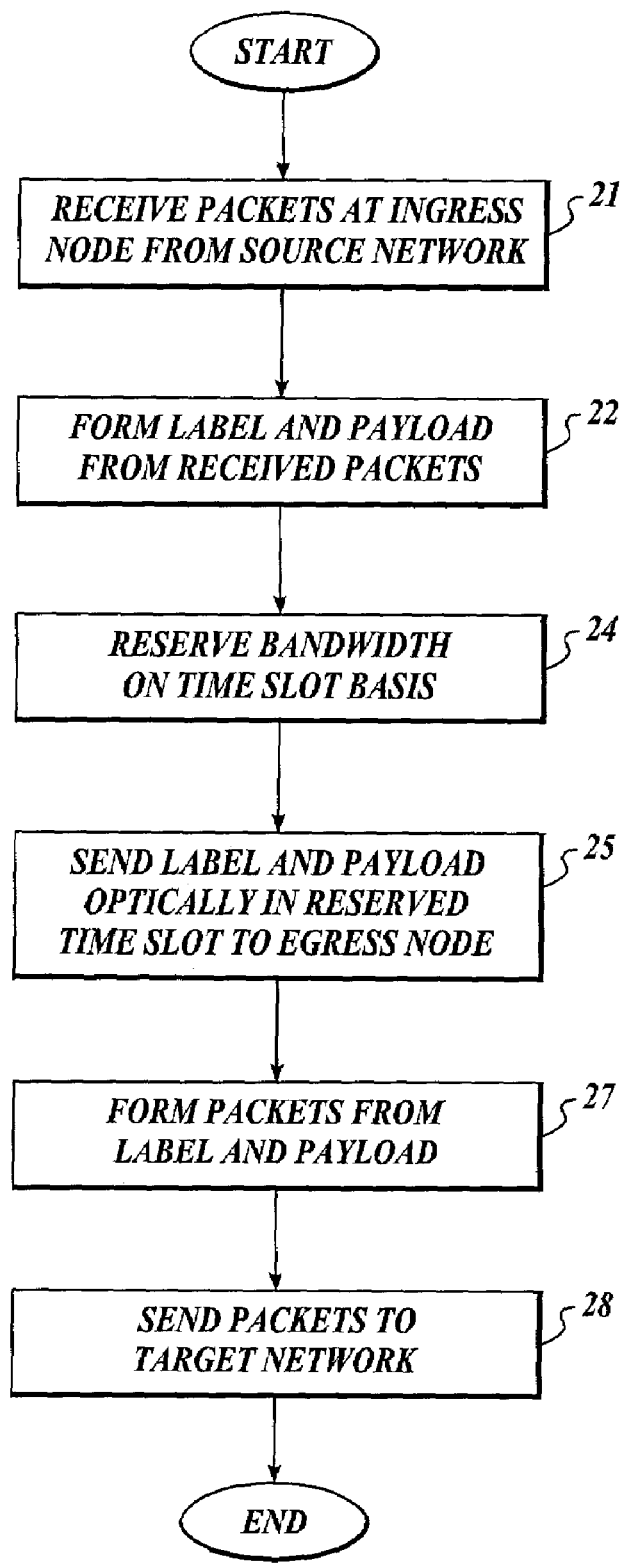
FIG. 2 is a simplified flow diagram illustrating the operation of an optical burst switching network, according to one embodiment of the present invention.

FIG. 2 illustrates the operational flow of optical burst switching network 10, according to one embodiment of the present invention. Referring to FIGS. 1 and 2, optical burst switching network 10 operates as follows.

Optical MAN 11 receives packets from LANs $13_1$–$13_N$. In one embodiment, optical MAN 11 receives IP packets at ingress switching nodes $15_1$–$15_M$. The received packets can be in electronic form rather than in optical form, or received in optical form and then converted to electronic form. In this embodiment, the ingress switching nodes store the received packets electronically. A block 21 represents this operation.

For clarity, the rest of the description of the operational flow of optical burst switching network 10 focuses on the transport of information from ingress switching node $15_1$ to egress switching node 18. The transport of information from ingress switching nodes $15_2$–$15_M$ is substantially similar.

A label and payload (i.e., an optical burst) is formed from the received packets. In one embodiment, ingress switching node $15_1$ uses statistical multiplexing techniques to form the label and payload from the received packets stored in ingress switching node $15_1$. For example, packets received by ingress switching node $15_1$ and having to pass through egress switching node 18 on their paths to a destination can be assembled into an optical burst. A block 22 represents this operation.

Bandwidth is reserved to transport the optical burst through optical burst switching network 10. In one embodiment, ingress switching node $15_1$ reserves a time slot (i.e., a time slot of a TDM system) in an optical data signal path through optical burst switching network 10. Further, in one embodiment, the bandwidth is reserved for a time period sufficient to transport the optical burst from the ingress switching node to the egress switching node. For example, in some embodiments, the ingress switching nodes maintain a list of all used and available time slots. The time slots can be allocated and distributed over multiple wavelengths and optical fibers. Thus, a reserved time slot (also referred to herein as a TDM channel) may be in one wavelength of one fiber, or can be spread across multiple wavelengths and multiple optical fibers. A block 24 represents this operation.

When an ingress switching node reserves bandwidth or when bandwidth is released after an optical burst is transported, a master network controller (not shown) updates the list. In one embodiment, the master network controller and the ingress or egress switching nodes perform this updating process using various burst or packet scheduling algorithms based on the available network resources and traffic patterns. The available time slots, which are continuously broadcasted to all the ingress and egress switching nodes, are transmitted on the same wavelength as the optical labels or on a different common preselected wavelength throughout the optical network. The master network controller function can reside in one of the ingress switching nodes or can be distributed across two or more ingress switching nodes.

The optical burst (i.e., payload) is then transported through optical burst switching network 10 in the reserved time slot or TDM channel. In one embodiment, ingress switching node $15_1$ transmits the label to the next switching node in the route determined by the network controller. In this embodiment, the network controller uses a dynamic routing protocol (e.g., GMPLS) over one or more wavelengths to determine the best available route to the next switching node. In one embodiment, ingress switching node $15_1$ then asynchronously transmits the payload to the same switching node with little or no time delay. A time delay allows the switching node to process the label and configure the optical core switches to appropriately switch and forward the payload to the next switching node without buffering or OEO conversion. In some embodiments, the switching node may perform OEO conversion of the label so that the node can extract routing information contained in the label. Further, in some embodiments, the TDM channel is propagated in wavelengths that are not used for propagating labels. Alternatively, the label and payload can be modulated on the same wavelength in the same optical fiber using different modulation formats. For example, labels can be transmitted using non-return-to-zero (NRZ) modulation format, while payloads are transmitted using return-to-zero (RZ) modulation format. The optical burst is transmitted from one switching node to another switching node in a similar optical MAN until the optical burst is transported to egress switching node 18. A block 25 represents this operation.

The IP packets are then extracted from the optical burst. In this embodiment, egress switching node 18 converts the optical burst to electronic signals that egress switching node 18 can process to recover the header and data segment of each of the packets. A block 27 represents this operation, which is basically the inverse of block 22.

The extracted IP packets are processed and then routed to the target network. In this embodiment, egress switching node 18 transmits the packets to the WAN using electronic signals rather than optical signals. A block 28 represents this operation.

IP Packets received at egress switching node 18 from the WAN can be transported to a targeted LAN via optical MAN 11 in a substantially similar manner. For example, the egress switching node 18 can receive and store packets from the WAN (similar to block 21). Egress switching node 18 can form optical bursts using statistical multiplexing techniques (similar to block 22). Egress switching node 18 can then reserve a TDM channel through optical MAN 11 (similar to block 24) and send the optical burst to a targeted ingress switching node via the reserved TDM channel (similar to block 25). The targeted ingress switching node can then extract the IP packets from the optical burst (similar to block 27) and send the IP packets electronically to the target LAN (similar to block 28).

Optical burst switching network 10 can achieve increased bandwidth efficiency through the additional flexibility afforded by the TDM channels. Although this exemplary embodiment described above includes an optical MAN having ingress, core and egress switching nodes to couple multiple LANs to an optical WAN backbone, in other embodiments the networks do not have to be LANs, optical MANs or WAN backbones. That is, optical MAN 11 need not service a "metropolitan area". Rather, optical burst switching network 10 may include a number of relatively small networks that are coupled to a relatively larger network that in turn is coupled to a backbone network.

Figure 3:
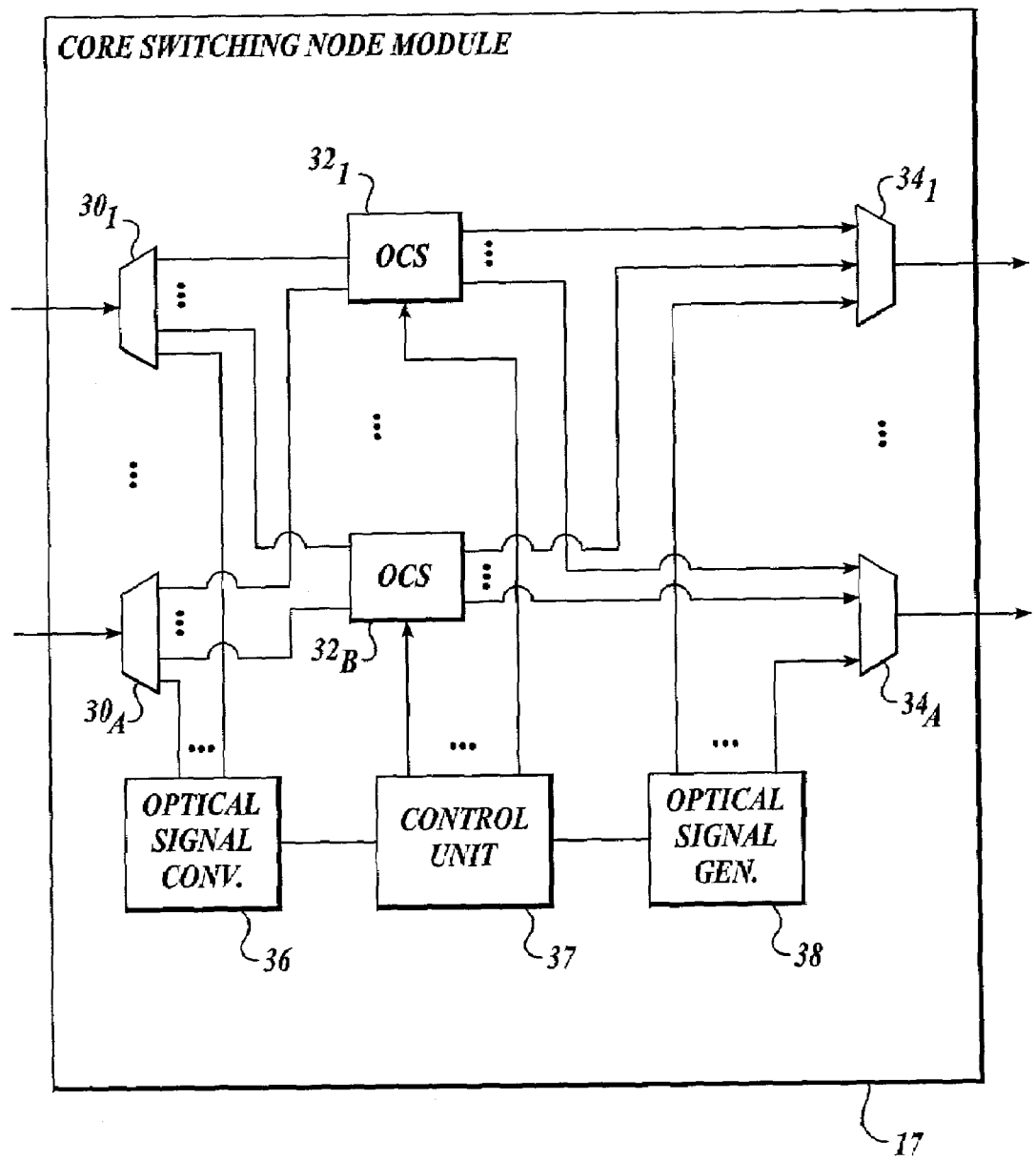
FIG. 3 is a block diagram illustrating a core node module for use in an optical burst switching network, according to one embodiment of the present invention.

FIG. 3 illustrates a module 17 for use as a core switching node in optical burst switching network 10 (FIG. 1), according to one embodiment of the present invention. In this embodiment, module 17 includes a set of optical wavelength division demultiplexers $30_1$–$30_A$, where A represents the number of input optical fibers used for propagating payloads, labels, and other network resources to the module. For example, in this embodiment, each input fiber could carry a set of C wavelengths (i.e., WDM wavelengths), although in other embodiments the input optical fibers may carry differing numbers of wavelengths. Module 17 would also include a set of N×N optical core switches $32_1$–$32_B$, where N is the number of input/output ports of each optical core switch. Thus, in this embodiment, the maximum number of wavelengths at each optical core switch is A·C, where N≧A·C. For embodiments in which N is greater than A·C, the extra input/output ports can be used to loop back an optical signal for buffering.

Further, although optical core switches $32_1$–$32_B$ are shown as separate units, they can be implemented as a B×B optical core switch using any suitable switch architecture. Module 17 also includes a set of optical wavelength division multiplexers $34_1$–$34_A$, a set of optical-to-electrical signal converters 36 (e.g., photo detectors), a control interface unit 37, and a set of electrical-to-optical signal converters 38 (e.g., lasers).

The elements of this embodiment of module 17 are interconnected as follows. Optical demultiplexers $30_1$–$30_A$ are connected to a set of A input optical fibers that propagate input optical signals from other switching nodes of optical burst switching network 10 (FIG. 10). The output leads of the optical demultiplexers are connected to the set of B core optical switches $32_1$–$32_B$ and to optical signal converter 36. For example, optical demultiplexer $30_1$ has B output leads connected to input leads of the optical core switches $32_1$–$32_B$ (i.e., one output lead of optical demultiplexer $30_1°$ to one input lead of each optical core switch) and at least one output lead connected to optical signal converter 36.

The output leads of optical core switches $32_1$–$32_B$ are connected to optical multiplexers $34_1$–$34_A$. For example, optical core switch $32_1$ has A output leads connected to input leads of optical multiplexers $34_1$–$34_A$ (i.e., one output lead of optical core switch $32_1$ to one input lead of each optical multiplexer). Each optical multiplexer also an input lead connected to an output lead of electrical-to-optical signal converter 38. Control unit 37 has an input lead or port connected to the output lead or port of optical-to-electrical signal converter 36. The output leads of control unit 37 are connected to the control leads of optical core switches $32_1$–$32_B$ and electrical-to-optical signal converter 38. As described below in conjunction with the flow diagram of FIG. 5, module 17 is used to receive and transmit optical bursts. In one embodiment, the labels and payloads of the optical bursts have transmission formats as shown in FIGS. 4A and 4B.

Figure 4A:
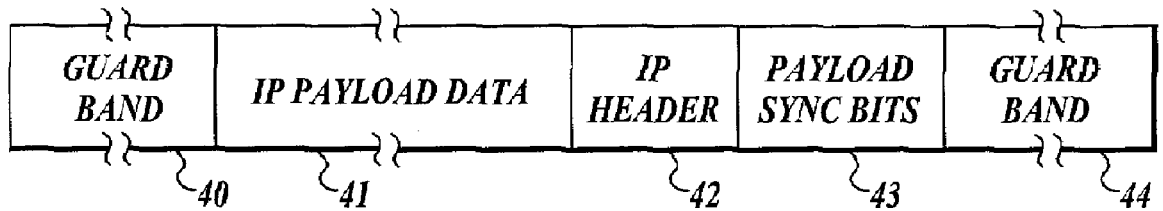
FIGS. 4A and 4B are diagram illustrating the format of an optical payload and an optical label for use in an optical burst switching network, according to one embodiment of the present invention.

FIG. 4A illustrates the format of an optical payload for use in optical burst switching network 10 (FIG. 1), according to one embodiment of the present invention. In this embodiment, each optical payload has a start guard band 40, an IP payload data segment 41, an IP header segment 42, a payload sync segment 43 (typically a small number of bits), and an end guard band 44 as shown in FIG. 4A. IP payload data segment 41 includes the data segments of the IP packets used to form the burst. Although FIG. 4A shows the payload as contiguous, module 17 transmits payloads in a TDM format. It should be pointed out that in this embodiment, the optical labels have local significance only at the optical MAN, and may loose their significance at the optical WAN.

Figure 4B:
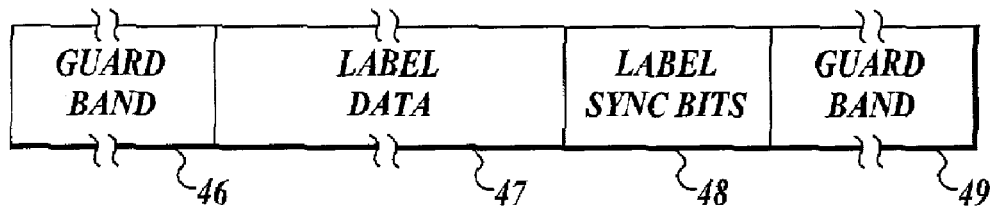

FIG. 4B illustrates the format of an optical label for use in optical burst switching network 10 (FIG. 1), according to one embodiment of the present invention. In this embodiment, each optical label has a start guard band 46, an IP label data segment 47, a label sync segment 48 (typically a small number of bits), and an end guard band 48 as shown in FIG. 4B. Label data segment 47 contains the header information of the IP packets used to form the optical burst. Although FIG. 4B shows the payload as contiguous, in this embodiment module 17 transmits labels in a TDM format.

Figure 5:
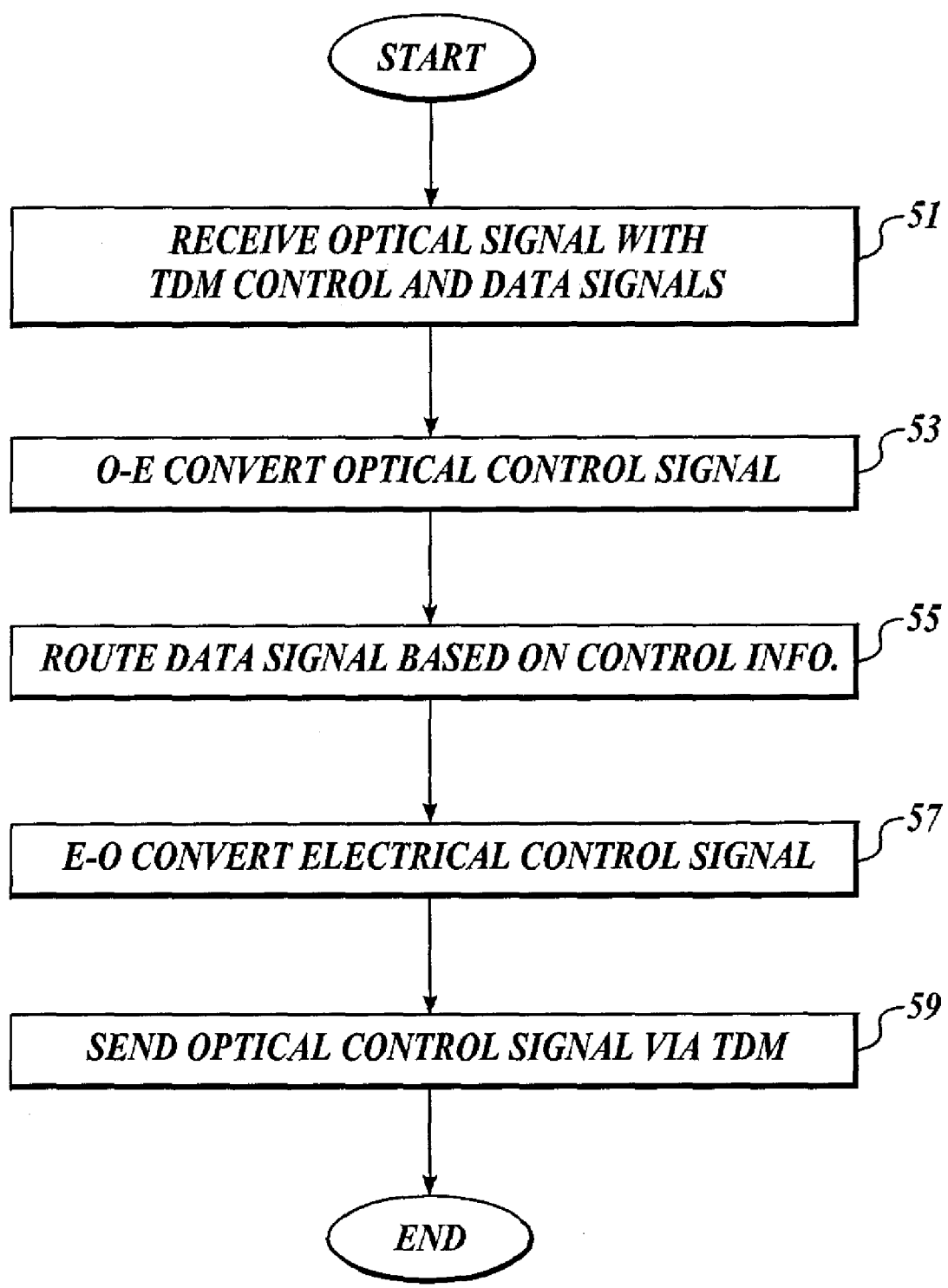
FIG. 5 is a flow diagram illustrating the operation of a core switching node module, according to one embodiment of the present invention.

FIG. 5 illustrates the operational flow of module 17 (FIG. 3), according to one embodiment of the present invention. Referring to FIGS. 3 and 5, module 17 operates as follows.

Module 17 receives an optical signal with TDM control and data signals. In this embodiment, module 17 receives a control signal (i.e., label signal in this embodiment) and a data signal (i.e., payload signal in this embodiment) at one or two of the optical demultiplexers. For example, the label signal may be modulated on a first wavelength of an optical signal received by optical demultiplexer $30_A$, while the payload signal is modulated on a second wavelength of the optical signal received by optical demultiplexer $30_A$. In some embodiments, the label signal may be received by a first optical demultiplexer while the payload signal is received by a second optical demultiplexer. A block 51 represents this operation.

Module 17 converts the optical control signal into an electrical signal. In this embodiment, the control signal is the label signal, which is separated from the received optical signal by the optical demultiplexer and sent to optical-to-electrical signal converter 36. Optical-to-electrical signal converter 36 converts the optical label signal into an electrical signal. For example, in one embodiment each portion of the TDM label signal is converted to an electrical signal and stored by optical-to-electrical signal converter 36. The stored portions are then reassembled to form the label, which is then received by control unit 37. In this embodiment, control unit 37 stores and processes the labels. A block 53 represents this operation.

Module 17 then routes the optical data signals (i.e., payload signals in this embodiment) to one of optical multiplexers $34_1$–$34_A$, based on routing information contained in the label. In this embodiment, control unit 37 processes the label to extract the routing information and sends appropriate control signals to the set of B optical core switches $32_1$–$32_B$ to re-configure each of the core switches to switch the corresponding payload signals. A block 55 represents this operation.

Module 17 then converts the processed electrical control signal (i.e. label signal in this embodiment) to an optical signal. In this embodiment, control unit 37 provides time slots alignment so that the reconverted or new label signal is generated in the desired wavelength and TDM time slot. The new label may be modulated on a wavelength and/or time slot that are different form the wavelength and time slot of the label signal received in block 51. A block 57 represents this operation.

Module 17 then sends the optical control signal (i.e., label signal in this embodiment) to the next switching node in the route. In this embodiment, electrical-to-optical signal generator 38 sends the new label signal to appropriate optical multiplexer of optical multiplexers $34_1$–$34_A$ to achieve the route. A block 59 represents this operation.

Figure 6:
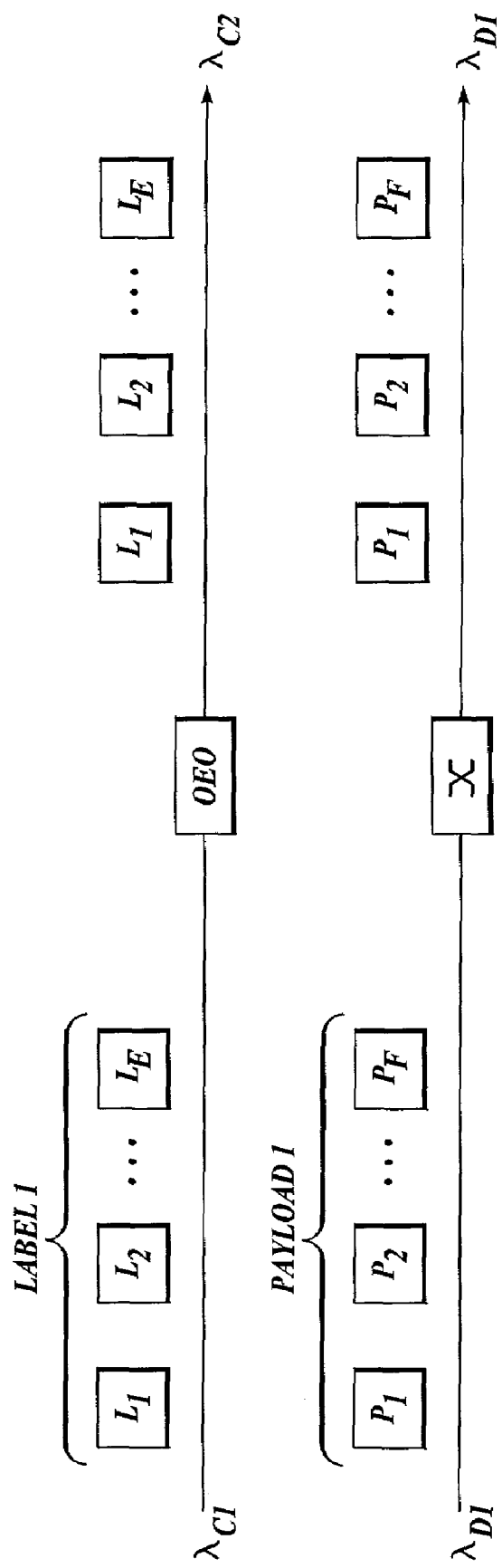
FIG. 6 is a diagram illustrating time slot provisioning, according to one embodiment of the present invention.

FIG. 6 illustrates time slot or TDM channel provisioning, according to one embodiment of the present invention. In this example, a label signal is propagated on a control wavelength $\lambda_{C1}$ while the corresponding payload signal is propagated on a data wavelength $\lambda_{D1}$ via an output optical fiber(s) selected according to the routing information contained in the label signal. In some embodiments, the label signal is transmitted before the payload signal with sufficient lead time to allow all the nodes in the route to process the label signal before it receives the payload signal. In this way, the modules can configure their optical core switches to transport the payload signal with minimal delay. As shown in FIG. 6, in this example the label signal is TDM transmitted in E portions on control wavelength $\lambda_{C1}$. Although not shown, other label signals can be TDM transmitted in different time slots of wavelength $\lambda_{C1}$. The payload signal in this example is TDM transmitted in F portions on data wavelength $\lambda_{C1}$.

When received by a module (e.g., module 17 of FIG. 3), the label signal undergoes OEO conversion so that the label signal can be processed to extract control information (e.g., routing information). The processed label signal is then transmitted out of the module via an output optical fiber(s) selected by the routing information extracted from the received label signal. In this embodiment, the label signal can be transmitted on a different control wavelength (e.g., wavelength $\lambda_{C2}$) as shown in the FIG. 6 example. In other instances, the module can transmit the new label signal on the same control wavelength that the module received the label signal.

The payload signal, when received by the module, is not OEO converted. Rather, the optical core switch module switches the payload signal in the appropriate TDM channel, and route the payload signal to the next switching node based on the new routing information contained in the label. The TDM channel is on the same data wavelength (wavelength $\lambda_{D2}$) as shown in the FIG. 6 example, but the wavelength is propagated by the optical fiber selected by the optical core switches of the module. In some embodiments, the optical core switch module may change the available time slot using fiber delay lines.

Figure 7:
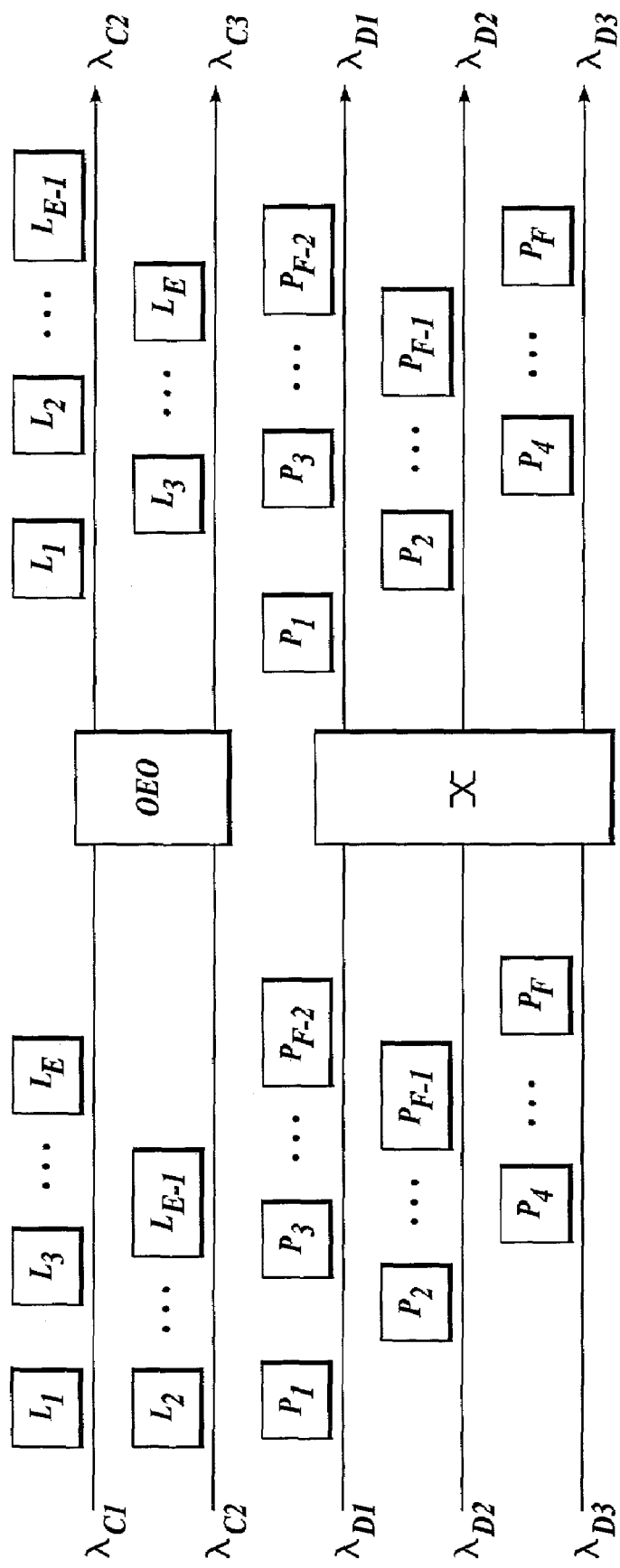
FIG. 7 is a diagram illustrating multi-wavelength time slot provisioning, according to one embodiment of the present invention.

FIG. 7 illustrates multi-wavelength time slot or TDM channel provisioning, according to one embodiment of the present invention. This embodiment, the label signal is TDM propagated on control wavelengths $\lambda_{C1}$ and $\lambda_{C2}$. As shown in FIG. 7, when received by the module, some TDM portions of the label signal are propagated in time slots on wavelength $\lambda_{C1}$ while others are propagated in time slots on wavelength $\lambda_{C2}$. After OEO conversion, the new label signal can be TDM transmitted on different wavelengths and/or time slots. Similarly, the TDM portions of the payload signal are distributed over multiple wavelengths. In this example, the TDM portions of the payload signal are optically switched to the selected output optical fibers on the same wavelengths and time slots as received. However, in other embodiments, the TDM portions of the payload signal can be transmitted in different timeslots.

Figure 8:
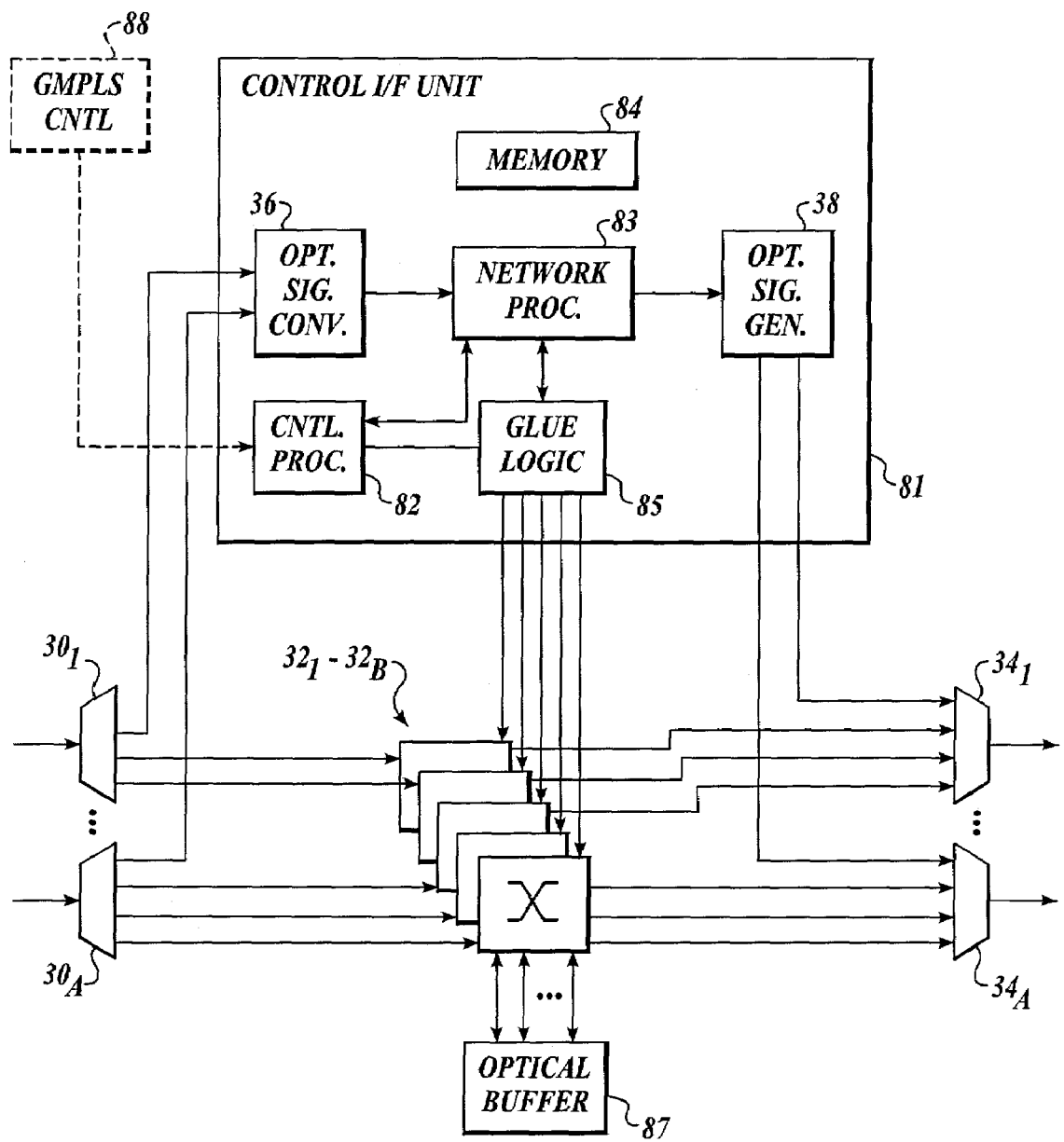
FIG. 8 is a block diagram illustrating a core switching node module that supports generalized multi-protocol label switching (GMPLS), according to one embodiment of the present invention.

FIG. 8 illustrates module 17 that implements a core switching node of optical burst switching network 10 (FIG. 1) that supports generalized multi-protocol label switching (GMPLS), according to one embodiment of the present invention. This embodiment is similar to the embodiment of FIG. 3, except that control unit 37 is contained in a control interface unit 81 that also contains the set of optical-to-electrical signal converters 36 and the set of electrical-to-optical signal generators 38. In addition, control unit 37 is implemented with a control microprocessor 82, a network processor 83, memory 84 and glue logic 85. This embodiment of module 17 also includes an optical buffer 87 implemented with precision fiber delay lines. In this embodiment, optical core switches $32_1$–$32_B$ are implemented using the fast polysilicon trench waveguide technology disclosed in two co-pending and commonly assigned U.S. Patent Applications both entitled "Method and Apparatus For Steering An Optical Beam In A Semiconductor Substrate", Ser. No. 09/811,171 filed Mar. 16, 2001 by Ansheng Liu et al., and Ser. No. 09/819,160 filed Mar. 27, 2001 by Ansheng Liu et al. In other embodiments, different types of optical core switch technology can be used.

This embodiment of module 17 operates in substantially the same way as described above in conjunction with FIGS. 3 and 5. More particularly to this embodiment, control processor 82 can receive GMPLS information from a network master controller 88 (shown in dashed lines) that is external to the module. In such an embodiment, the network master controller can be a separate hardware processing unit, or a software module residing in a module external to module 17. In this embodiment, network master 88 is configured to provide control using known GMPLS protocol. In this way, network master controller 88 can maintain the list of available TDM channels and determine an efficient route to transport an optical burst. In another embodiment, the network master controller can reside as a software module in network processor 83.

Network processor 83 can perform label swapping, TDM control, burst assembly/disassembly, and other necessary functions. Network processor 83 can provide timing and control signals to glue logic 85 to control the timing and switch configuration of the optical core switches to process the routing information extracted from received label signals. Network processor 83 can also control the optical core switches to route signals to optical buffer 87 when a desired TDM channel is not available (e.g., due to contention). With the networking protocol used in optical burst switching network 10 (FIG. 1), the size of optical buffer 87 (e.g., the length of the optical delay lines) can be significantly smaller than what would be required to implement for a conventional optical burst or packet switching network.

This embodiment of module 17 can be modified to implement egress switching nodes by adding circuitry for optical-to-electrical conversion of payload signals and memory for electrically storing the converted payload data. In addition, an electronic output interface would be added to this module 17 to output IP packets to the WAN.

Similarly, this embodiment of module 17 can be modified to implement an ingress module by adding an electronic input interface to receive and store IP packets from the access networks and circuitry for electrical-to-optical conversion of the stored packet header and data segments that are combined to form an optical burst.

Embodiments of method and apparatus for implementing an optical burst switching network are described herein. In the above description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable optical manner in one or more embodiments.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, embodiments of this invention may be used as or to support software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system for use in an optical switching network, comprising:
   an optical-to-electrical signal (OE) converter;
   an optical core switch (OCS) unit;
   an optical demultiplexer unit (DMUX) coupled to the OE converter and the OCS unit, wherein the DMUX is configurable to route a control signal and a data signal received via a plurality of optical input lines to the OE converter and the OCS unit, respectively, the data signal being a time division multiplexed (TDM) signal having at least a portion received at a first TDM input channel;
   an optical multiplexer unit (MUX) coupled to the OCS unit and couplable to a plurality of optical output lines that provide propagation paths for a plurality of TDM output channels;
   an optical signal generator (OSG) coupled to the DMUX,
   an ingress switching node to reserve a TDM time slot in one of the plurality of TDM output channels and to maintain a list of all used and available time slots of the plurality of TDM output channels; and
   a control unit coupled to the OCS unit, the OE converter and the OSG, the control unit to cause the OCS unit to route at least a portion of the data signal to the reserved TDM time slot of the TDM output channel of the plurality of TDM output channels via the MUX based on routing information contained in the control signal and to update the list of all used and available time slots when the ingress switching node reserves a TDM time slot.

2. The system of claim 1 wherein the control signal is modulated on a first optical signal and the data signal is modulated on a second optical signal having a wavelength that is different from that of the first optical signal.

3. The system of claim 2 wherein the control signal is a TDM signal.

4. The system of claim 1 wherein the control signal is modulated according to a modulation scheme that is different from that of the data signal.

5. The system of claim 4 wherein the control signal and the data signal are modulated on the same optical signal.

6. The system of claim 5 wherein the control signal and the data signal are modulated on the same wavelength.

7. The system of claim 1 wherein time slots of the data signal can be distributed over a plurality of wavelengths.

8. The system of claim 1 wherein the control unit is configurable to cause the OCS unit to route the data signal to a TDM channel different from the first TDM channel when the first TDM channel is not available to propagate the data signal.

9. The system of claim 1 further comprising an optical buffer coupled to the OCS unit to temporarily buffer the data signal when no selected TDM output channels are immediately available to output the data signal from the circuit.

10. The system of claim 1 further comprising a memory, wherein the OE converter is configurable to convert the data signal into an electrical signal when the data signal is received from or is to be sent to a network external to the optical switching network so that the data signal can be stored in the memory.

11. A system for use in an optical switching network, the system comprising:
   converter means for converting an optical signal to an electrical signal;
   generator means for generating an optical signal;
   switch means, couplable between a plurality of optical input lines and a plurality of optical output times, for routing a control signal and a data signal received via the plurality of optical input lines to the converter means and the plurality of optical output lines, respectively, the data signal being a time division multiplexed (TDM) signal received at a first TDM input channel, the plurality of optical output lines for providing propagation paths for a plurality of TDM output channels;
   ingress switching means to reserve a TDM time slot in one of the plurality of TDM output channels and to maintain a list of all used and available time slots of the plurality of TDM output channels; and
   control means for causing the switch means to route at least a portion of the data signal to a first TDM output channel of the plurality of TDM output channels based on routing information contained in the control signal and for updating the list of all used and available time slots when the ingress switching node reserves a TDM time slot.

12. The system of claim 11 wherein the control signal is modulated on a first optical signal and the data signal is modulated on a second optical signal having a wavelength that is different from that of the first optical signal.

13. The system of claim 12 wherein the control signal is a TDM signal.

14. The system of claim 11 wherein the control signal is modulated according to a modulation scheme that is different from that of the data signal.

15. The system of claim 14 wherein the control signal and the data signal are modulated on the same optical signal.

16. The system of claim 15 wherein the control signal and the data signal are modulated on the same wavelength.

17. The system of claim 11 wherein time slots of the data signal can be distributed over a plurality of wavelengths.

18. The system of claim 11 wherein the control means is further for causing the switch means to route the data signal to a TDM output channel different from the first TDM output channel when the first TDM output channel is not available to propagate the data signal.

19. The system of claim 11 further comprising an optical buffer coupled to the switch means to temporarily buffer the data signal when no selected TDM output channels are available to output the data signal from the circuit.

20. The system of claim 11 further comprising a memory, wherein the optical signal converter is configurable to convert the data signal into an electrical signal when the data signal is received from or is to be sent to a network external to the optical switching network so that the data signal can be stored in the memory.

21. A method for use in an optical switching network, the method comprising:
   receiving a control signal at a first time division multiplexed (TDM) input channel of an input optical link;
   converting the control signal to an electrical signal to extract routing information;
   reserving a TDM time slot in one of a plurality of TDM output channels based on the routing information, and maintaining a list of all used and available time slots of the plurality of TDM output channels updating the list of all used and available unit slots when a TDM time slot is reserved; and
   routing a data signal corresponding to the received control signal to the reserved TDM time slot of the TDM output channel.

22. The method of claim 21 wherein the input optical link has a first component signal with a first wavelength and a second component signal with a second wavelength different from the first wavelength, the control and data signals being respectively modulated on the fast and second component signals.

23. The method of claim 21 wherein the control signal is modulated on the input optical link according to a first modulation scheme and the data signal is modulated on the input optical link according to a second modulation scheme that is different from the first modulation scheme.

24. The method of claim 21 further comprising routing the data signal to a second TDM output channel of the output optical link when the first TDM output channel is not available to propagate the data signal.

25. The method of claim 21 further comprising buffering the data signal when no TDM channels of the output optical link are available to propagate the data signal.

26. The method of claim 21, wherein the control signal includes a GMPLS (Generalized Multi-Protocol Label Switching) label that contains information for reserving at least one TDM output channel during the reserved timeframe.

27. The method of claim 21, further comprising dynamically routing the control signal in consideration of available bandwidth for subsequent transport of the data signal.

28. An apparatus for use in an optical switching network, the apparatus comprising:
   means for receiving an optical input signal with a plurality of time division multiplexed (TDM) input channels, the optical input signal including asynchronous control and data signals respectively in a first TDM input channel and a second TDM input channel of the plurality of TDM input channels;
   means for converting the control signal to an electrical signal to extract routing information;
   means for reserving a TDM time slot in one of a plurality of TDM output channels, based on the routing information, and maintaining a list of all used and available time slots of the plurality of TDM output channels;
   means for updating the list of all used and available time slots when a TDM time slot is reserved; and
   means for routing at least a portion of the data signal to the reserved TDM time slot of the TDM channel of the optical output signal.

29. The apparatus of claim 28 wherein the optical input signal has a first component signal with a first wavelength and a second component signal with a second wavelength different front the first wavelength, the control and data signals being respectively modulated on the first and second component signals.

30. The apparatus of claim 28 wherein the control signal is modulated on the optical input signal according to a first modulation scheme and the data signal is modulated on the optical input signal according to a second modulation scheme.

31. The apparatus of claim 28 further comprising means for routing the data signal to a second TDM output channel of the optical output signal when the first TDM channel is not available to propagate the data signal.

32. The apparatus of claim 28 further comprising means for optically buffering the data signal when no TDM channels of the optical output signal are immediately available to propagate the data signal.

33. An apparatus for use in an optical switching network, the apparatus comprising:
    an optical port to receive an optical input signal, the optical input signal including first and second time division multiplexed (TDM) input channels respectively propagating a control signal and a data signal;
    an optical converter coupled to receive the control signal and to convert the control signal to an electrical signal;
    an ingress switching node to reserve a TDM time slot in one of a plurality of TDM output channels and to maintain a list of all used and available time slots of the plurality of TDM output channels;
    a control unit coupled to the optical converter to process the electrical signal to extract routing information and to update the list of all used and available time slots when the ingress switching node reserves a TDM time slot;
    an optical signal generator coupled to the control unit to convert the processed electrical signal to an optical signal to form a new control signal; and
    a switch unit coupled to an output port, wherein the switch unit is configurable to output at least a portion of the data signal to the reserved TDM time slot of the TDM output channel.

34. The apparatus of claim 33 wherein the optical input signal has a first component signal with a first wavelength and a second component signal with a second wavelength, the control and data signals being respectively modulated on the first and second component signals.

35. The apparatus of claim 33 wherein the control signal is modulated on the optical input signal according to a first modulation scheme and the data signal is modulated on the optical input signal according to a second modulation scheme.

36. The apparatus of claim 33 wherein the switch unit is configurable to route the data signal to a third TDM channel of the optical output signal when the first TDM channel is not available to propagate the data signal.

37. The apparatus of claim 33 further comprising an optical buffer to buffer the data signal when no TDM channels of the optical output signal are available to propagate the data signal.

38. An optical switching network, comprising:
    an ingress module;
    an egress module; and
    a plurality of core modules coupled to the ingress and egress modules, wherein each core module of the plurality of core modules includes:
      an optical receiver to convert an optical signal to an electrical signal,
      an optical transmitter to generate an output optical signal;
      a switch unit to respectively route a control signal and a data signal received at an input including a plurality of optical input lines to the optical receiver and to a plurality of output lines providing propagation paths for a plurality of time division multiplexed (TDM) channels, the data signal being a time division multiplexed TDM signal, and
      a control unit coupled to the switch unit, wherein the control unit reserves a TDM time slot in one of the plurality of TDM output channels, to maintain a list of all used and available time slots of the plurality of TDM output channels, and to update the list of all used and available tune slots when the ingress switching node reserves a TDM time slot, and wherein the control unit is configurable to cause the switch unit to mute at least a portion of the data signal to the reserved TDM time slot of the TDM output channel.

39. The network of claim 38 wherein the control signal is modulated on a first optical signal and the data signal is modulated on a second optical signal having a wavelength that is different from that of the first optical signal.

40. The network of claim 38 wherein the control signal is modulated according to a modulation scheme that is different from that of the data signal.

41. The network of claim 40 wherein the control signal and the data signal are modulated on a single wavelength propagated on an optical input line of the plurality of optical input lines.

42. The network of claim 40 wherein the control unit is configurable to cause the optical signal generator to output the optical output signal as a new control signal, the control unit further to cause the switch unit to route the new control signal to a second TDM output channel of the plurality of TDM output channels.

43. A method for use in an optical switching network, the method comprising:
    receiving packets from a source external to the optical switching network, the optical switching network having an ingress node, an egress node and a plurality of core switching nodes, the packets being received at the ingress node;
    forming a label including routing information and corresponding payload from received packets;
    transporting the label via the plurality of core switching nodes to the egress node;
    at each core switching node traversed by the label, reserving a time division multiplexed (TDM) time slot in one of a plurality of TDM output channels for each hop to a next core switching node or the egress node;
    at each ingress node maintaining a list of all used and available time slots of the plurality of TDM output channels and updating the list of all used and available time slots when the ingress node reserves a TDM time slot; and
    transporting the payload via the core switching nodes traversed by the label to the egress node during the reserved timeframe for each hop.

44. The method of claim 43 wherein forming a label and corresponding payload further comprises statistically multiplexing the received packets to form the label and payload.

45. The method of claim 43 wherein the label and corresponding payload are transported asynchronously.

46. The method of claim 43 further comprising forming packets from the label and payload after the label and payload are received by the egress node and sending the packets to a target network.

47. The method of claim 43 further comprising releasing the reserved bandwidth after the payload has been transported to the egress node.

48. The method of claim 43 wherein the payload includes a first guard band, an internet protocol (IP) data segment, an IP header, a plurality of synchronization bits and a second guard band.

49. The method of claim 43 wherein the label includes a first guard band, a label data segment, a plurality of synchronization bits and a second guard band.

50. The method of claim 43 wherein each core node of the plurality of core switching nodes is configurable to transport a received payload without converting the payload from an optical signal to an electrical signal.

51. The method of claim 50 wherein each core node of the plurality of core switching nodes is configurable to convert the label from an optical signal to an electrical signal for processing, and then convert the electrical signal back to an optical signal before transporting the label to a next node of the optical switching network.

52. The method of claim 43 further comprising routing the payload to a different TDM channel when a reserved TDM channel for a given hop is not available to propagate the payload.

53. The method of claim 43 wherein optical signals used for transporting the label and the payload employ the same wavelength.

54. The method of claim 43 wherein optical signals used for transporting the label and the payload employ the same wavelength.

55. The method of claim 43, wherein the label comprises a GMPLS (Generalized Multi-Protocol Label Switching) label.

56. The method of claim 43, further comprising dynamically routing the control signal in consideration of available bandwidth for subsequent transport of the data signal 57. An optical switching network, comprising:
means for receiving packets from a source external to the optical switching network;
means for forming a label and corresponding payload from received packets, the label including routing information;
means for optically transporting the label through the optical switching network in view of the routing information, the label traversing a plurality of hops;
means for reserving a time division multiplexed (TDM) time slot in one of a plurality of TDM output channels;
means for maintaining a list of all used and available time slots of the plurality of TDM output channels and updating the list of all used and available time slots when the ingress node reserves a TDM time slot; and
means for optically transporting the payload through the optical switching network during the reserved timeframe using the at least one TDM channel reserved for each hop.

58. The network of claim 57 wherein the means for forming the label and corresponding payload is configurable to statistically multiplex the received packets forming the label and payload.

59. The network of claim 57 further comprising means for forming packets to be sent to a target network from the label and payload after the label and payload are transported through the optical switching network.

60. The network of claim 57 further comprising means for releasing the reserved bandwidth after the payload has been transported through the optical switching network.

61. The network of claim 57 wherein a core node of the plurality of core switching nodes further comprises means for routing the payload to a different TDM channel when a reserved TDM channel for a given hop is not available to propagate the payload.

62. The network of claim 57 wherein the means for optically transporting the payload includes a plurality of core switching nodes, each core node of the plurality of core switching nodes being configurable to transport a received payload without converting the payload from an optical signal to an electrical signal.

63. The network of claim 62 wherein each core node of the plurality of core switching nodes is configurable to convert the label from an optical signal to an electrical signal for processing, and then convert the electrical signal to an optical signal before transporting the label to a next node of the optical switching network.

64. The network of claim 57 wherein optical signals used for transporting the label and the payload employ different wavelengths.

65. The network of claim 57 wherein optical signals used for transporting the label and the payload employ the same wavelength.

66. The optical switching network of claim 57, wherein the label comprises a GMPLS (Generalized Multi-Protocol Label Switching) label.

67. The optical switching network of claim 57, wherein the means for reserving bandwidth and the means for optically transporting the label dynamically route the label in consideration of available bandwidth for subsequent transport of the data signal.

68. An optical switching network, comprising:
a plurality of local area networks (LANs);
a wide area network (WAN); and
an optical metropolitan area network (OMAN), coupled between the WAN and the plurality of LANs, having a plurality of modules that each include:
an optical receiver to convert an optical signal to an electrical signal,
an optical transmitter to generate an optical signal,
a switch unit to respectively route a control signal and a data signal received at an input including a plurality of optical input lines to the optical receiver and to a plurality of output lines providing propagation paths for a plurality of time division multiplexed (TDM) channels, the data signal being a time division multiplexed TDM signal
an ingress switching mode to reserve; and
a control unit coupled to the switch unit, wherein the control unit reserves a TDM time slot in one of the plurality of TDM output channels, wherein the control unit maintains a list of all used and available time slots of the plurality of TDM output channels, wherein the control unit updates the list of all used and available time slots when a TDM time slot is reserved, and wherein the control unit is configurable to cause the switch unit to route at least a portion of the data signal to the first TDM output channel during the reserved timeframe.

69. The network of claim 68 wherein the control signal is modulated on a first optical signal and the data signal is modulated on a second optical signal having a wavelength that is different from that of the first optical signal.

70. The network of claim 68 wherein the control signal is modulated according to a modulation scheme that is different from that of the data signal.

71. The network of claim 70 wherein the control signal and the data signal are modulated on a single wavelength propagated on an optical input line of the plurality of optical input lines.

72. The network of claim 68 wherein time slots of the data signal can be distributed over a plurality of wavelengths.

73. The network of claim 68 wherein the control unit is further for causing the switch unit to route the data signal to a TDM channel different from the first TDM channel when the first TDM channel is not available to propagate the data signal.

74. The network of claim 68 wherein a module of the plurality of modules further comprises an optical buffer coupled to the switch unit to buffer the data signal when no TDM channels of the plurality of TDM channels are available to output the data signal from the module.

75. An optical switching network, comprising:
an ingress module that includes an optical input port to receive packets from a source external to the optical switching network, wherein the ingress module is configurable to form a label and corresponding payload from received packets, the label used to reserve a time division multiplexed (TDM) time slot in one of the plurality of TDM output channels, to maintain a list of all used and available time slots of the plurality of TDM output channels and to update the list of all used and available time slots when the ingress switching node reserves a TDM time slot, and to propagate the payload through the optical switching network for the reserved time slot; and
a plurality of core modules to optically transport the label and the payload from the ingress module through the optical switching network, the payload being transported to the reserved time slot.

76. The network of claim 75 wherein the ingress module is further configurable to statistically multiplex the received packets to form the label and payload.

77. The network of claim 75 further comprising an egress module coupled to the plurality of core modules to receive the label and payload, wherein the egress module is configurable to form packets to be sent to a target network from the label and payload.

78. The network of claim 75 wherein the plurality of core modules and the ingress and egress modules are configurable to release the reserved bandwidth after the payload has been transported through the optical switching network.

79. The network of claim 75 wherein a core module of the plurality of core modules is further configurable to route the payload to a different TDM channel when a reserved TDM channel for a given hop is not available to propagate the payload.

80. The network of claim 75 wherein each core module of the plurality of core modules is configurable to transport a received payload without converting the payload from an optical signal to an electrical signal 81. The network of claim 80 wherein each core module of the plurality of core modules is configurable to convert the label from an optical signal to an electrical signal for processing, and then convert the electrical signal to an optical signal for being transported to a next node of the optical switching network.

82. The network of claim 75 wherein optical signals used for transporting the label and the payload employ different wavelengths.

83. The network of claim 75 wherein optical signals used for transporting the label and the payload employ a single wavelength.

84. The system of claim 1 wherein the control signal includes a GMPLS (Generalized Multi-Protocol Label Switching) label that contains information for reserving the TDM output channel during the reserved timeframe.

85. The system of claim 1 wherein each of a duration of the reserved timeframe and a latency between when a control signal is received and when a corresponding reserved timeframe commences are variable in length for a given optical input line.

86. The system of claim 1 wherein the control signal is dynamically routed in consideration of available bandwidth for subsequent transport of the data signal.

87. The system of claim 1, wherein a TDM channel may provide variable and fixed-length timeframes for transporting variable or fixed-length data bursts within optical switching network.

* * * * *